(12) United States Patent
Parr

(10) Patent No.: US 10,350,946 B2
(45) Date of Patent: Jul. 16, 2019

(54) SNOW TIRE WITH DIRECTIONAL PADDLES

(71) Applicant: Bridgestone Americas Tire Operations, LLC, Nashville, TN (US)

(72) Inventor: Richard S. Parr, Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 446 days.

(21) Appl. No.: 15/030,743

(22) PCT Filed: Oct. 29, 2014

(86) PCT No.: PCT/US2014/062813
§ 371 (c)(1),
(2) Date: Apr. 20, 2016

(87) PCT Pub. No.: WO2015/066125
PCT Pub. Date: May 7, 2015

(65) Prior Publication Data
US 2016/0250898 A1    Sep. 1, 2016

Related U.S. Application Data

(60) Provisional application No. 61/897,585, filed on Oct. 30, 2013.

(51) Int. Cl.
*B60C 11/13* (2006.01)
*B60C 11/03* (2006.01)
*B60C 11/12* (2006.01)

(52) U.S. Cl.
CPC ...... *B60C 11/1307* (2013.01); *B60C 11/0302* (2013.01); *B60C 11/0306* (2013.01);
(Continued)

(58) Field of Classification Search
CPC ............. B60C 11/0302; B60C 11/0309; B60C 11/0386; B60C 11/1307;
(Continued)

(56) References Cited

U.S. PATENT DOCUMENTS 4,926,919 A    5/1990    Hopkins et al.
5,535,798 A    7/1996    Nakamura
(Continued)

FOREIGN PATENT DOCUMENTS

CA    2083627    *    5/1993
EP    1572473 B1        7/2009
(Continued)

OTHER PUBLICATIONS

JP 2002-36820, English language machine translation [epo.org] (Year: 2002).*
(Continued)

*Primary Examiner* — Eric Hug
(74) *Attorney, Agent, or Firm* — Shaun J. Fox; John Skeriotis

(57) ABSTRACT

A vehicle tire may have a tread with a circumferential groove defined by side faces of two circumferential ribs. The side faces may have a number of radially extending paddles formed by a pair of walls. A ratio of the length of one wall to the other may be at least 1.2.

3 Claims, 16 Drawing Sheets

(52) U.S. Cl.
CPC ....... *B60C 11/0327* (2013.01); *B60C 11/1236* (2013.01); *B60C 2011/0344* (2013.01); *B60C 2011/0346* (2013.01); *B60C 2011/0353* (2013.01); *B60C 2011/0374* (2013.01); *B60C 2011/0381* (2013.01); *B60C 2011/0386* (2013.01); *B60C 2011/1213* (2013.01); *B60C 2011/1338* (2013.01)

(58) Field of Classification Search
CPC . B60C 2011/1338; B60C 11/11; B60C 11/04; B60C 11/042; B60C 11/045
USPC ............. 152/209.18, 209.21, 209.22, 209.28
See application file for complete search history.

(56) References Cited

U.S. PATENT DOCUMENTS

| | | | |
|---|---|---|---|
| 5,665,184 A | 9/1997 | Fukumoto | |
| D385,235 S | 10/1997 | Young | |
| D415,451 S | 10/1999 | Weber et al. | |
| D420,953 S | 2/2000 | Poling | |
| 6,026,874 A | 2/2000 | Shibata et al. | |
| 6,250,354 B1 * | 6/2001 | Kawai | B60C 11/0306 152/209.18 |
| 6,382,283 B1 * | 5/2002 | Caretta | B60C 11/12 152/209.18 |
| 6,412,531 B1 | 7/2002 | Janajreh | |
| 6,415,835 B1 | 7/2002 | Heinen | |
| D461,162 S | 8/2002 | Young et al. | |
| 6,604,564 B1 | 8/2003 | Thiebaud | |
| 6,866,076 B2 | 3/2005 | Ohsawa | |
| 6,986,372 B2 | 1/2006 | Below | |
| 7,182,113 B2 | 2/2007 | Saguchi | |
| 7,195,044 B2 | 3/2007 | Maxwell et al. | |
| 7,311,127 B2 | 12/2007 | Ohashi | |
| 7,380,577 B2 | 6/2008 | Merino Lopez | |
| 7,438,101 B2 | 10/2008 | Shirouzu | |
| 7,537,033 B2 | 5/2009 | Yamane | |
| 7,543,617 B2 | 6/2009 | Matsumoto | |
| 7,819,153 B2 | 10/2010 | Byrne et al. | |
| 8,181,682 B2 | 5/2012 | Miyazaki | |
| 8,776,847 B2 | 7/2014 | DeBenedittis | |
| 9,033,013 B2 | 5/2015 | Brown | |
| 2003/0192634 A1 * | 10/2003 | Hino | B60C 11/0306 152/209.18 |
| 2007/0240801 A1 * | 10/2007 | Tanaka | B60C 11/0302 152/209.21 |
| 2010/0078106 A1 | 4/2010 | Gaus | |
| 2012/0103493 A1 | 5/2012 | Knispel | |
| 2013/0153104 A1 | 6/2013 | Buxton | |

FOREIGN PATENT DOCUMENTS

| | | | |
|---|---|---|---|
| FR | 2640913 A1 | | 6/1990 |
| JP | 5-169918 | * | 7/1993 |
| JP | 2002-36820 | * | 2/2002 |
| WO | 2011105673 A1 | | 9/2011 |

OTHER PUBLICATIONS

De Salvo, Shawn, Examiner's Requisition for Corresponding Canadian Patent Application No. 2927941, dated Feb. 9, 2017, 4 pp., Quebec, Canada.

Dou, Hongwei, First Office Action for Corresponding Chinese Patent Application No. 201480059799X, dated Nov. 28, 2016, 9 pp., Beijing, China.

Lee, Hun Gil, International Search Report with Written Opinion from PCT/US2014/062813, 15 pp. (dated Feb. 11, 2015).

* cited by examiner

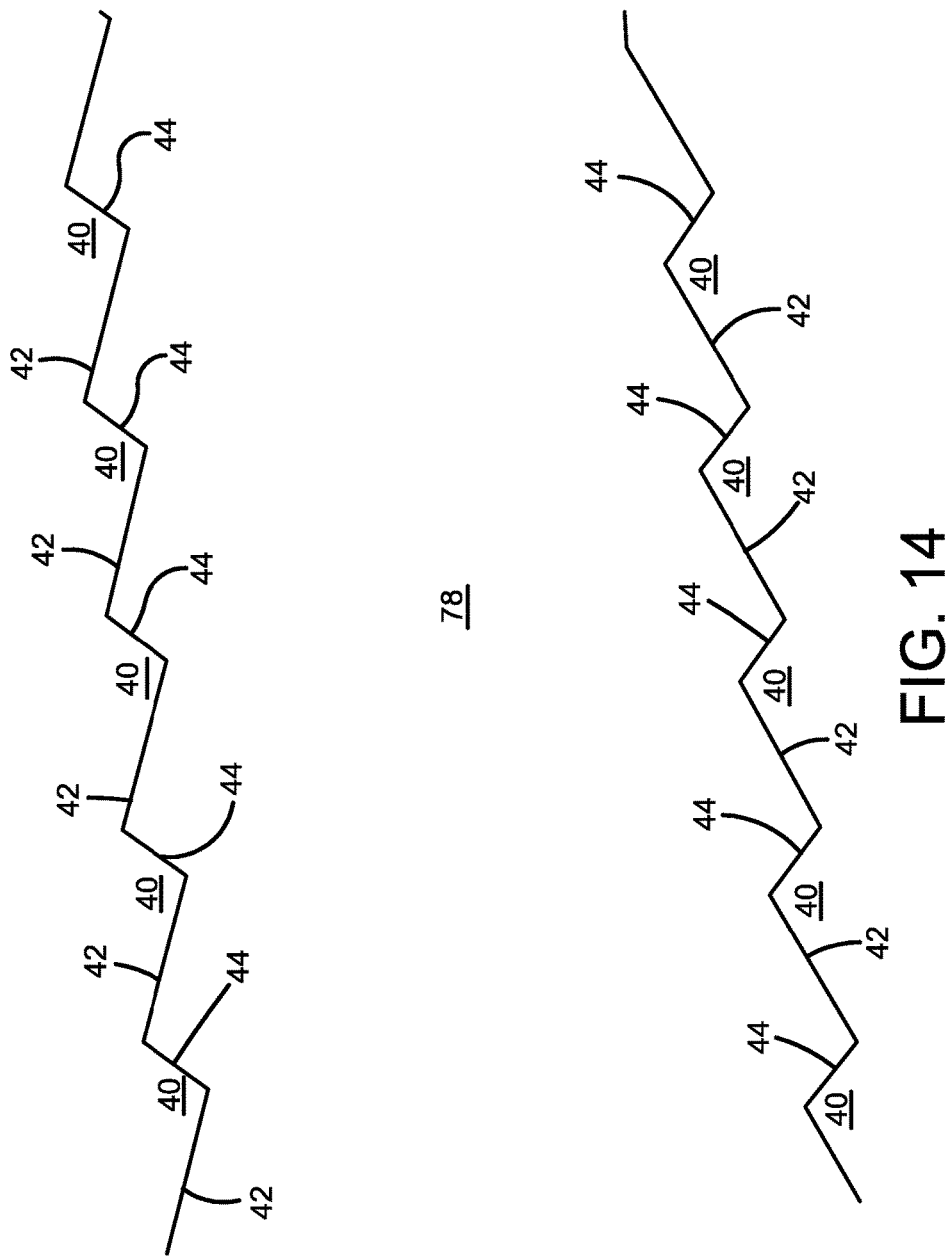

SNOW TIRE WITH DIRECTIONAL PADDLES

I. BACKGROUND

A. Field of the Invention

This invention generally relates to vehicle tires and, more particularly, to directional winter vehicle tires having a tread design that enhances braking and acceleration in snow.

B. Description of Related Art

It is well known to provide tires with various tread designs to improve the performance of vehicles that use the tires. Some tires are especially designed for use in winter, and thus have tread features that improve the tire's (and thus the vehicle's) performance on snow, ice and the like.

To improve a tire's performance, it is known to provide a tread with circumferential ribs having non-planar side walls. U.S. Pat. No. 6,250,354, for example, discloses a tire tread having a central circumferential groove formed by circumferential ribs having corrugated sides. The corrugated sides are formed by furrows and ridges having walls of equal length. U.S. Pat. No. 6,986,372 discloses a tire tread having a pair of outer circumferential grooves formed by circumferential ribs having sides with serrations. The serrations are on angled portions of the sides and are formed by walls of equal length. Publication No. US 2007/0240801 discloses a tire tread having circumferential grooves formed by circumferential ribs having sides with a zigzag shape. The zigzag shape is formed by edges having a step shape in the circumferential direction.

This invention, in one embodiment, discloses a tire tread having at least one circumferential groove formed by circumferential ribs having sides with radially extending paddles that are significantly different than known designs. The orientation of the circumferential groove as well as the overall tread design may also be significantly different from known tire tread designs. As a result, this invention provides a vehicle tire with improved performance, especially as a winter tire, over known tires.

II. SUMMARY

According to one embodiment of this invention, a vehicle tire may have a tread comprising: a first circumferential rib having a side face that defines a first side of a circumferential groove; and, a second circumferential rib having a side face that defines a second side of the circumferential groove. The side face of the first circumferential rib may comprise a plurality of radially extending paddles each defined by first and second walls that extend from the side face of the first circumferential rib. The side face of the second circumferential rib may comprise a plurality of radially extending paddles each defined by first and second walls that extend from the side face of the second circumferential rib. A ratio RW of a length of each first wall to a length of each second wall for each of the of paddles may be at least 1.2.

According to another embodiment of this invention, a vehicle tire may have a tread comprising: a first circumferential groove defined by first and second side faces and a second circumferential groove defined by first and second side faces. Each of the first and second side faces of the first circumferential groove and the first and second side faces of the second circumferential groove may have a plurality of radially extending paddles each defined by first and second walls that extend from the corresponding side face. A ratio RW of a length of each first wall to a length of each second wall for each of the of paddles may be at least 1.2.

One advantage to this invention is that braking characteristics of a tire on snow may be enhanced.

Another advantage to this invention is that traction characteristics of a tire on snow may be enhanced.

Yet another advantage to this invention is that a directional tire may have both braking and traction characteristics enhanced on snow.

Other benefits and advantages of this invention will become apparent to those skilled in the art to which it pertains upon reading and understanding of the following detailed specification.

III. DEFINITIONS

The following definitions are applicable to the present invention.

"Axial" and "axially" refer to a direction that is parallel to the axis of rotation of a tire.

"Circumferential" and "circumferentially" refer to lines or directions extending along the perimeter of the surface of the tread parallel to the equatorial plane and perpendicular to the axial direction of the tire.

"Groove" refers to an elongated void in the tread of the tire that extends circumferentially or laterally. A groove may be straight, curved, zig-zag, wavy, or have other non-straight orientations.

"Equatorial Plane" (EP) means the plane perpendicular to the tire's axis of rotation and passing through the center of its tread.

"Inner" means toward the inside of the tire.

"Lateral" refers to a direction along the tread of the tire going from one sidewall of a tire to the other sidewall.

"Outer" means toward the outside of the tire

"Radial" and "radially" refer to a direction perpendicular to the axis of rotation of a tire.

"Side face" generally refers to a part of a tread element adjacent to a void, such as a groove, slot, or sipe.

"Sipe" refers to a thin slit formed in the surface of the tread that may extend laterally, circumferentially, or at an acute angle relative to the circumferential direction of the tire. A sipe can be straight, curved, zigzag, wavy, or take the form of any other non-straight configuration. A sipe can have a depth that is up to 100% of the maximum depth of a groove formed in the tread.

"Tread" refers to that portion of the tire that comes into contact with a surface under normal load.

"Tread element" refers to individual features of a tread that contact a road surface, such as ribs and blocks.

"Void" refers to grooves, slots, sipes, cutouts, and the like that are provided in the tread of the tire and contribute to the tread design.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 6B is a close-up view of a paddle showing the intersection point that connects a pair of lines collinear with the paddle walls.

FIG. 14 shows a relative orientation of paddles according to still another embodiment of this invention.

V. DETAILED DESCRIPTION

Figure 1:
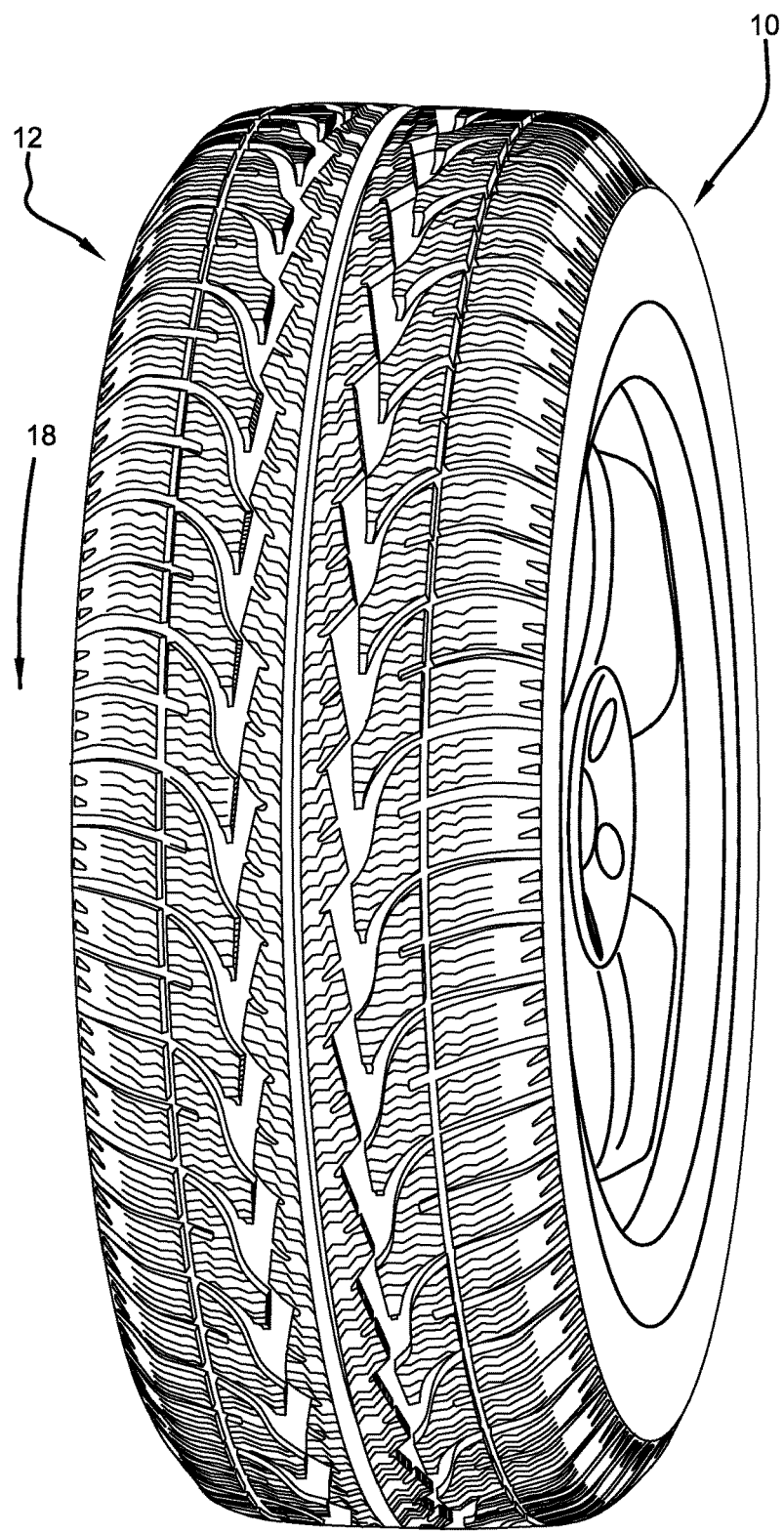
FIG. 1 is a perspective front view of a vehicle tire having a tread according to some embodiments of this invention.
Figure 2:
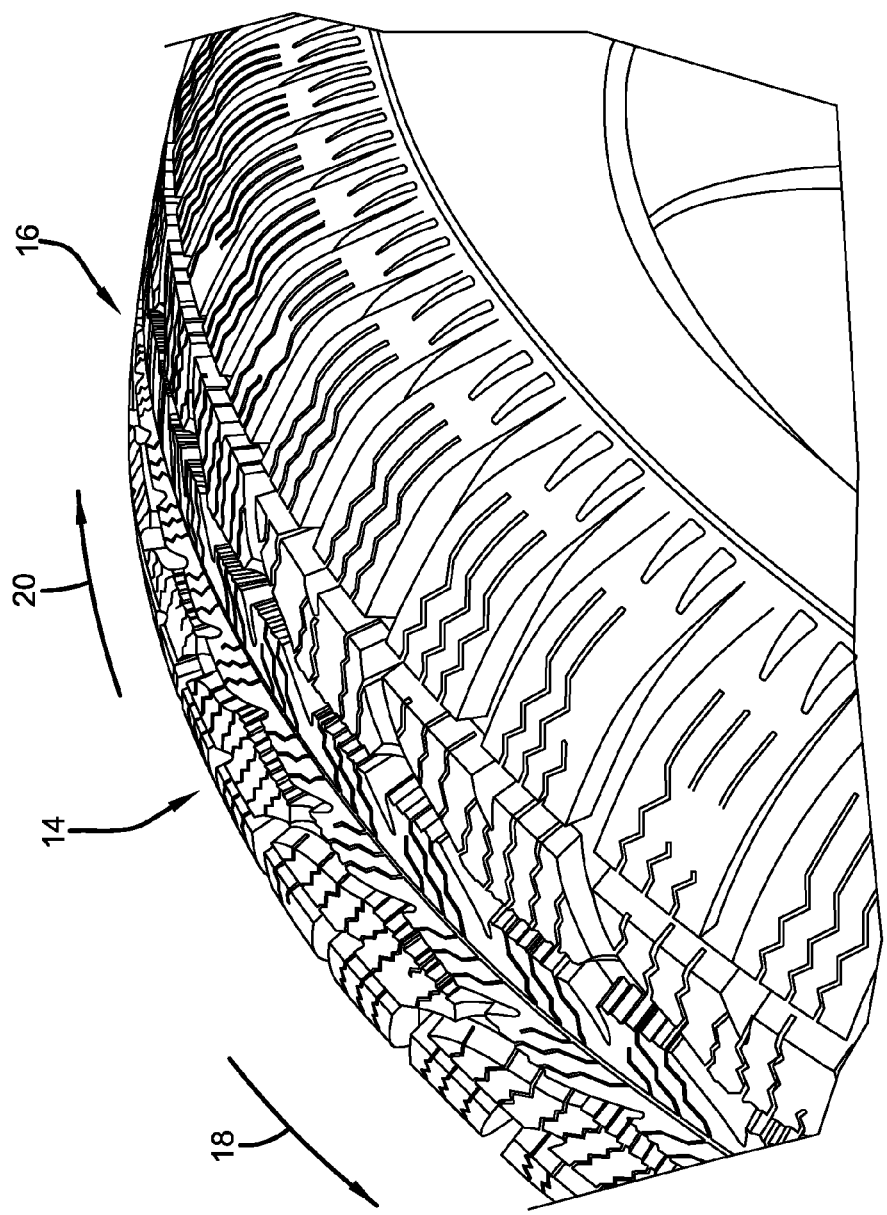
FIG. 2 is a perspective side view of a portion of a vehicle tire having a tread according to some embodiments of this invention.
Figure 3:
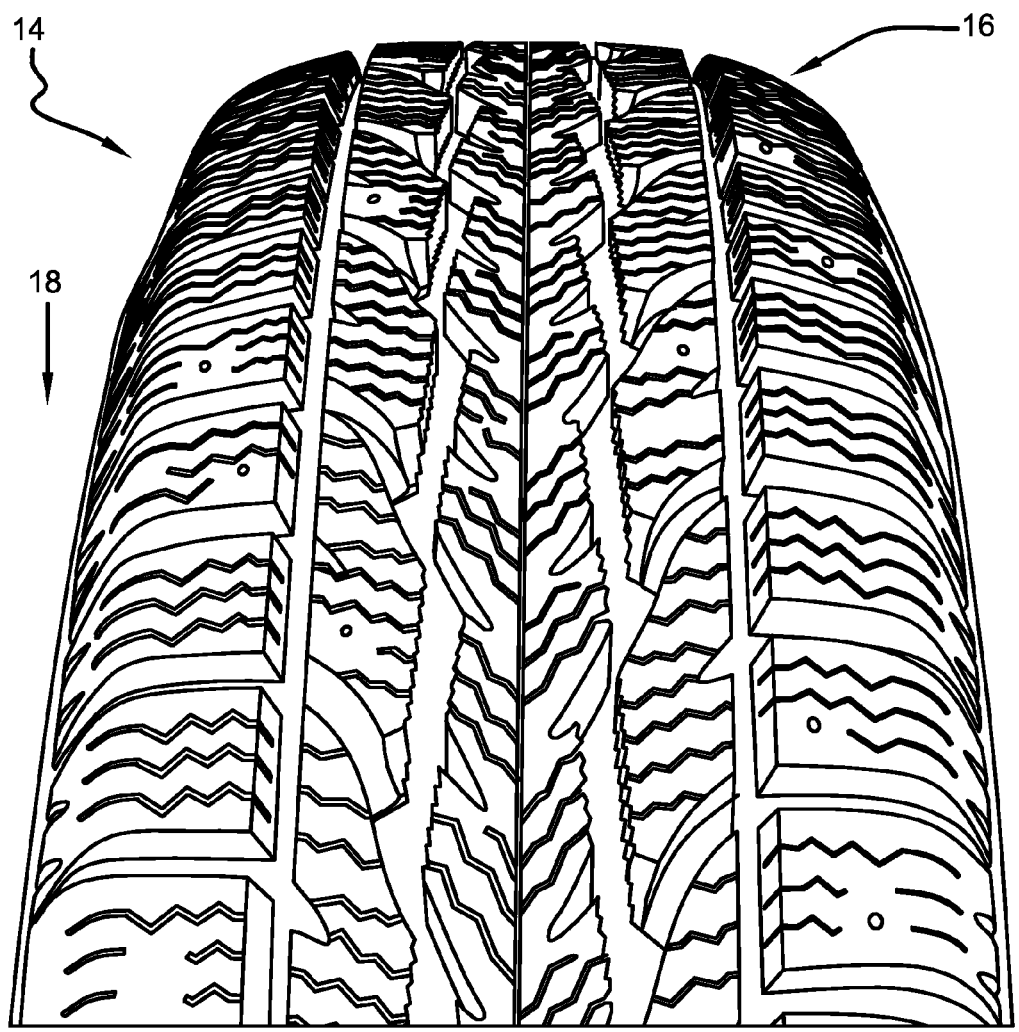
FIG. 3 is a partial front view of the vehicle tire shown in FIG. 2.

Referring now to the drawings wherein the showings are for purposes of illustrating embodiments of the invention only and not for purposes of limiting the same, and wherein like reference numerals are understood to refer to like components, FIG. 1 shows a vehicle tire 10 having a tread 12 according to some embodiments of this invention. FIGS. 2 and 3 show another vehicle tire 14 having a tread 16 according to other embodiments of this invention. While the tires 10, 14 shown are pneumatic passenger tires intended for use in winter conditions, it should be understood that features of this invention may improve performance in tires in other applications as well. The tires 10, 14 shown are directional tires, meaning that they are intended to rotate about their axes of rotation in one particular direction. Specifically, tires 10, 14 are directional in direction 18. Solely as a way to reference relative directions, the term "proximal" or "proximally" is defined as the direction opposite the direction of rotation and is shown with reference 20 in FIG. 2. The term "distal" or "distally" is the direction opposite the proximal direction and thus is the direction of rotation 18. It should be understood that features of this invention may improve performance in tires in that are not directional as well.

Figure 4:
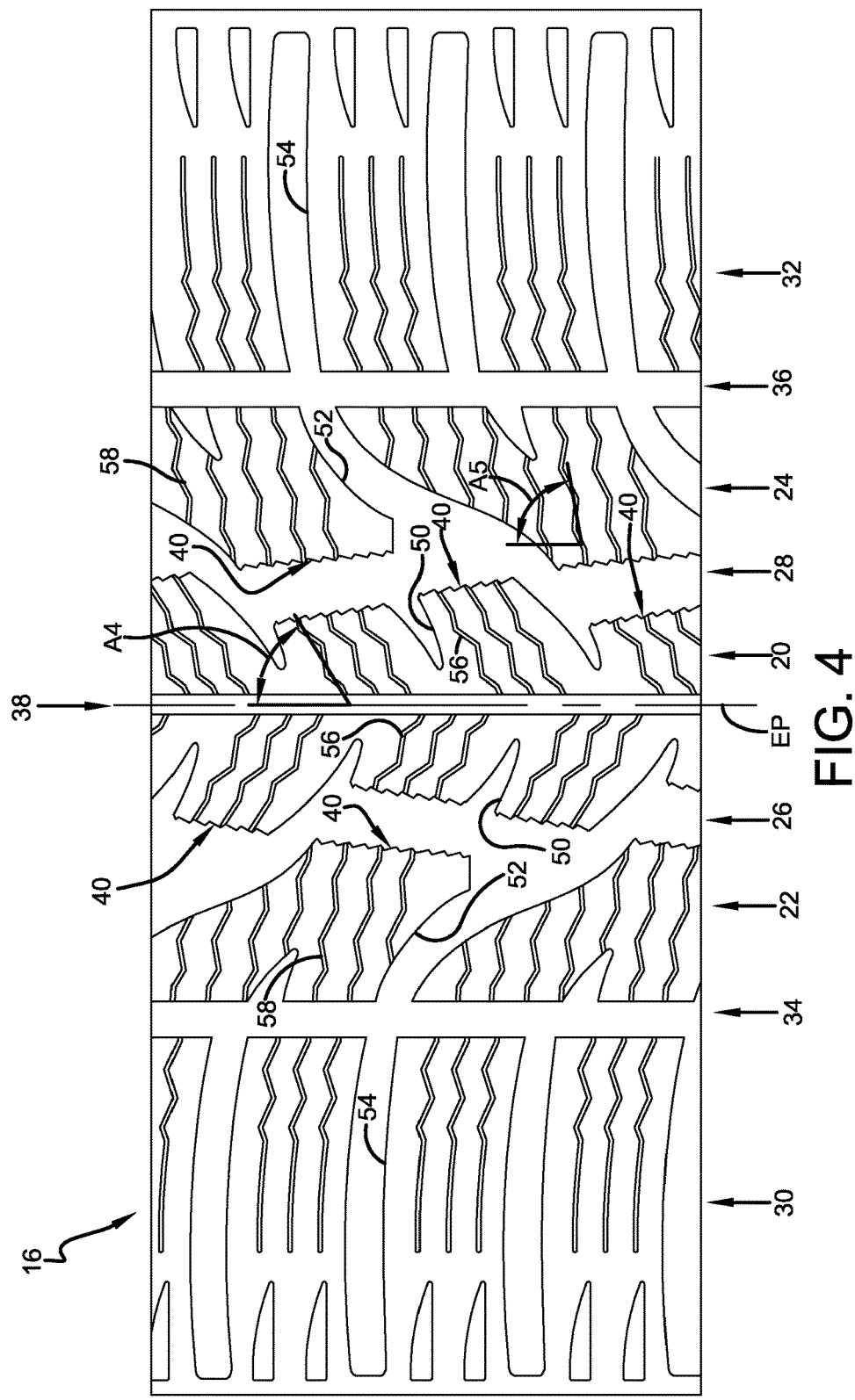
FIG. 4 is flattened sectional view of the tread shown in FIG. 3.

With reference now to FIG. 4, the tread 16 may have a center circumferential rib 20 located on or near the Equatorial Plane (EP) and first and second side circumferential ribs 22, 24 separated from the center rib 20 by first and second circumferential grooves 26, 28, as shown. The side circumferential ribs 22, 24 may thus be positioned on opposite sides of the EP. The tread 12 may have first and second outside circumferential ribs 30, 32 that are separated from the first and second side circumferential ribs 22, 24 by third and fourth circumferential grooves 34, 36. For the embodiment shown, the outside circumferential ribs 30, 32 are shoulder ribs. In one embodiment, a fifth circumferential groove 38 may positioned on or substantially on the EP, as shown.

Figure 4A:
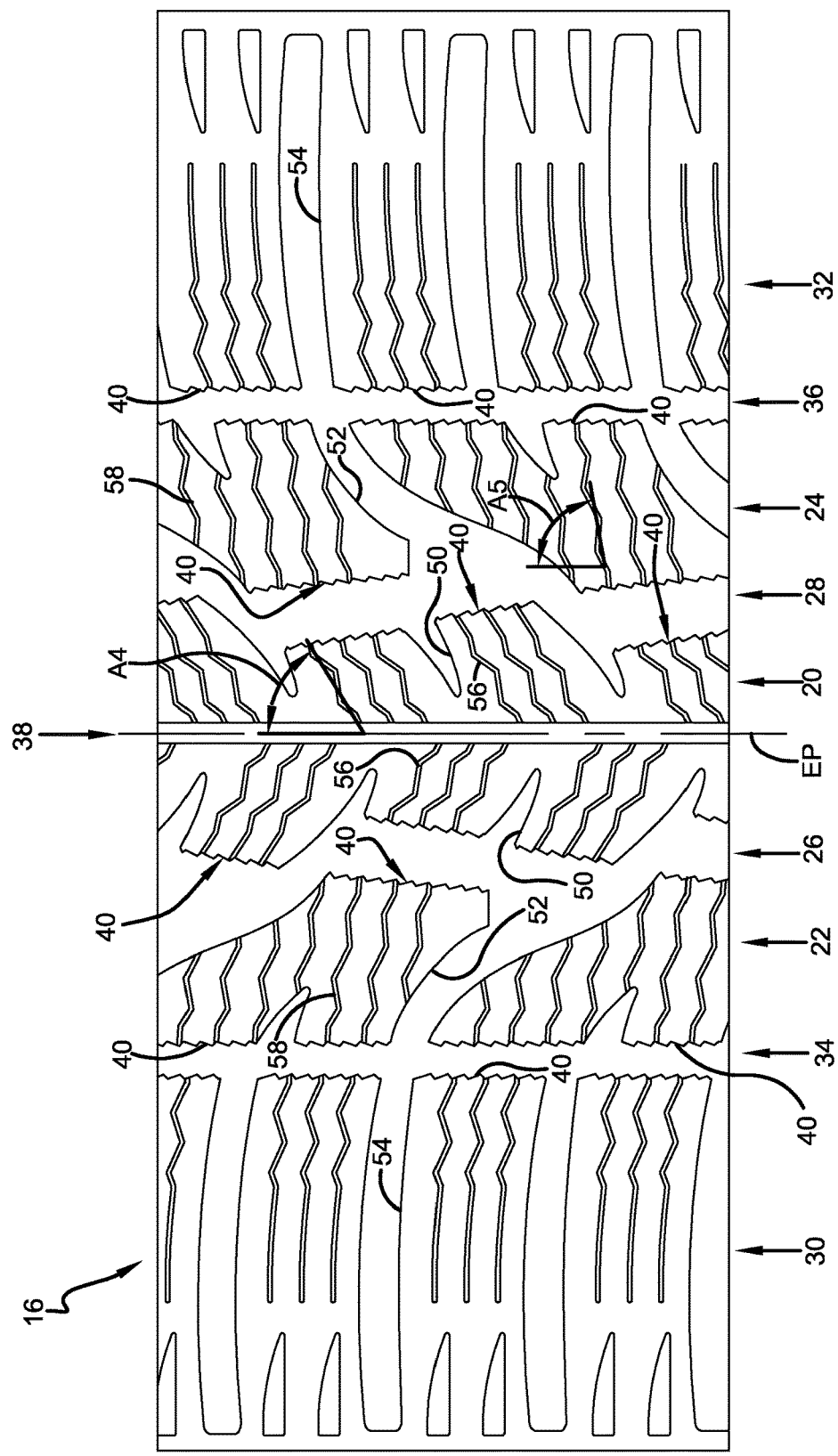
FIG. 4A is a view similar to that shown in FIG. 4 except with paddles formed in the outer grooves.
Figure 5:
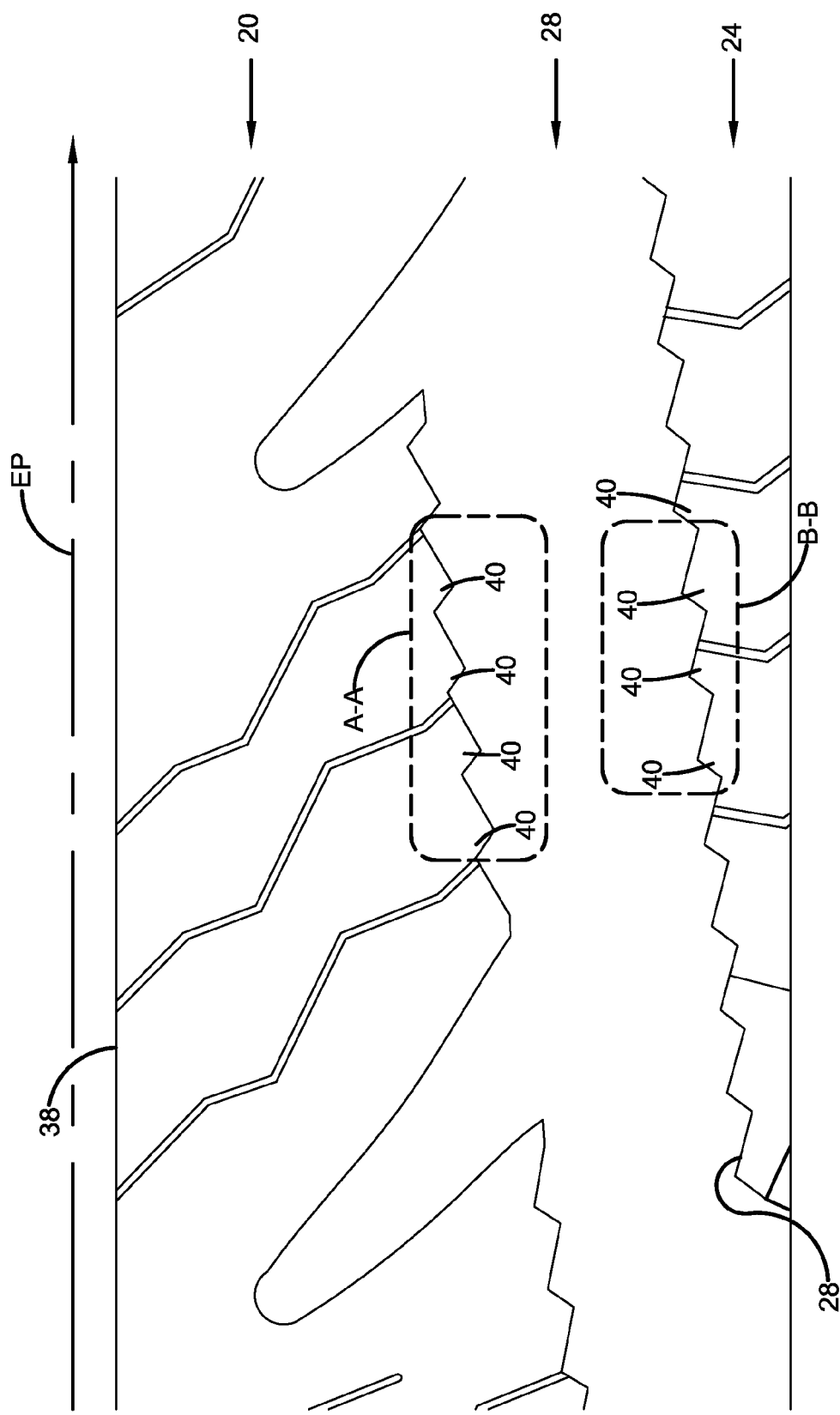
FIG. 5 is a close-up view of a portion of the tread shown in FIG. 3.

With continuing reference to FIG. 4, to improve winter performance of the tire, specifically enhanced braking and/or acceleration traction in snow, radially extending paddles 40 may be used. The paddles 40 enable the tread to gather and hold snow in the tread pattern. This advantage is increased when the tire is directional, as noted above. Specifically, when the tire is directional, traction in snow is enhanced by the paddles 40 as the vehicle accelerates to rotate the directional tire in direction 18. When the tire is braked, the paddles 40 enhance braking performance. The paddles 40 may be formed on the side faces of the ribs that define circumferential grooves. For the embodiment shown, paddles 40 are formed on the (left) side face of center circumferential rib 20 and (right) side face of first side circumferential rib 22, defining circumferential groove 26 as shown in FIG. 4, and on the (right) side face of center circumferential rib 20 and (left) side face of second side circumferential rib 24, defining circumferential groove 28. For the embodiment shown, no paddles 40 are formed on the circumferential ribs defining circumferential grooves 34, 36 and 38. In another embodiment, shown in FIG. 4A, paddles may be formed 40 on only one or both sides of any circumferential groove chosen with the sound judgment of skill in the art.

With reference now to FIGS. 4-7, each paddle may be defined by first and second walls 42, 44, that extend from the side face of the corresponding circumferential rib. The first wall 42 may have a length L1 and the second wall 44 may have a length L2. For the embodiment shown in FIG. 6, the first and second walls 42, 44 are connected at their outer ends with a point or tip 41a. In another embodiment, shown in FIG. 6A, one or more of the paddles may have walls 42, 44 that are connected at their outer ends with a curved shape 41b (that may be concave or convex in orientation). In yet another embodiment, shown in FIG. 6B, one or more of the paddles may have walls 42, 44 that are connected at their outer ends with a planar surface 41c. Other surfaces with shapes chosen with the sound judgment of a person of skill in the art may be used. While the walls 42, 44 shown are substantially planar, they may be curved in another embodiment. As shown in FIG. 6C, a pair of lines 60, 62 that are collinear with the first and second walls 42, 44 may pass through an intersection point 64. The use of the intersection point 64 will be discussed further below. Note that when the walls 42, 44 are connected at tip 41a, intersection point 64 and tip 41a are the same point.

Figure 6:
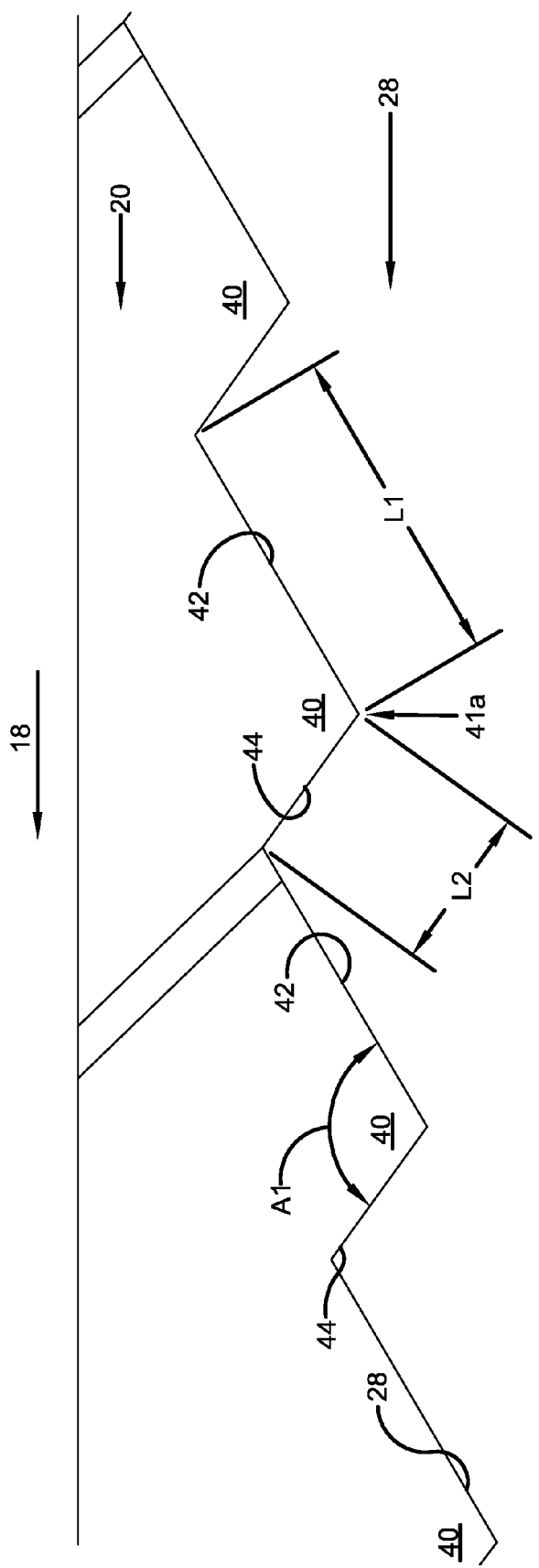
FIG. 6 is a close-up view of portion A-A shown in FIG. 5.
Figure 6A:
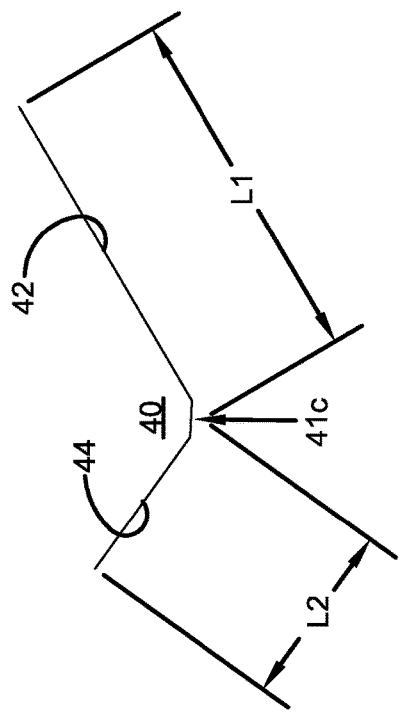
FIG. 6A is a close-up view of a paddle having a curved shape to connect the paddle walls.
Figure 6B:
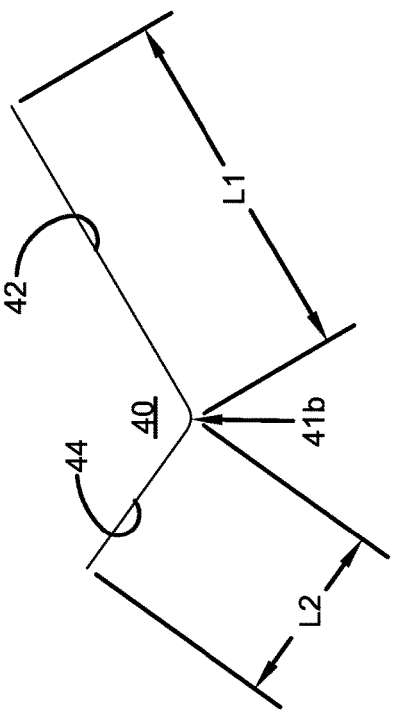
FIG. 6B is a close-up view of a paddle having a flat surface to connect the paddle walls.
Figure 6C:
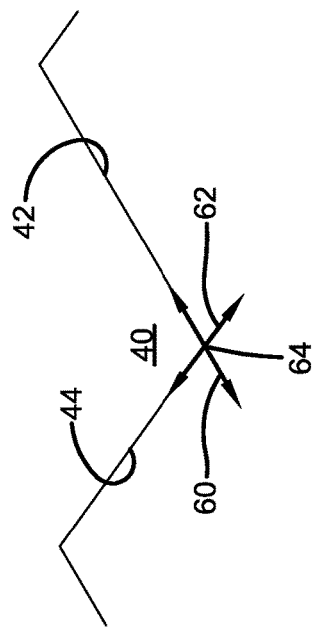
Figure 7:
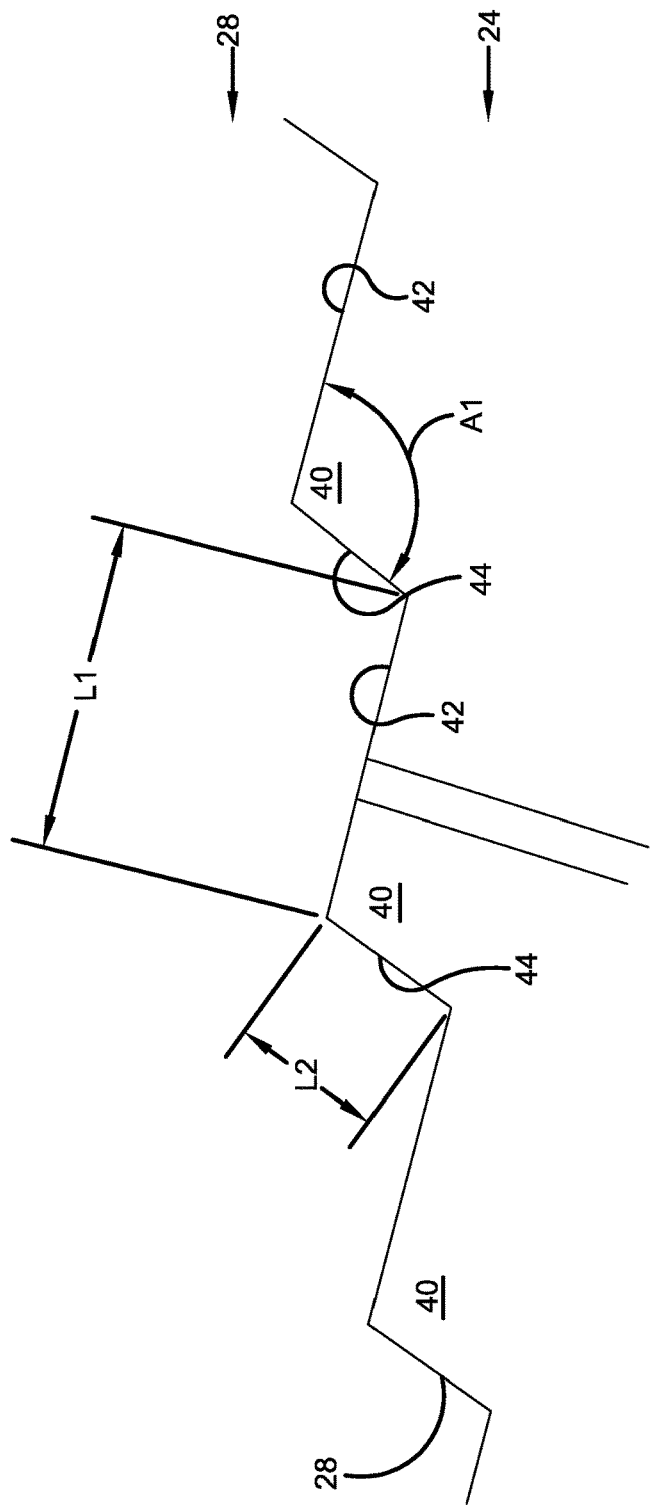
FIG. 7 is a close-up view of portion B-B shown in FIG. 5.

With reference now to FIGS. 6, 6A and 6B, in one embodiment, a ratio RW of L1/L2 for the paddles 40 is at least 1.2. In another embodiment, ratio RW is at least 1.4. In another embodiment, ratio RW is at least 1.6. In yet another embodiment, ratio RW is at least 1.8. For the embodiment shown, RW is about 1.9. In still another embodiment, ratio RW is at least 2.0. In another embodiment, ratio RW is not greater than 50.0. In another embodiment, ratio RW is not greater than 20.0. In yet another embodiment, ratio RW is not greater than 10.0. In still another embodiment, ratio RW is not greater than 5.0.

With reference now to FIGS. 1-5 and 7, using tires that are directional in direction 18, as shown, means that the first wall 42 of each paddle 40 is positioned proximally with respect to the corresponding second wall 44 and each second wall 44 is positioned distally with respect to the corresponding first wall 42. In one embodiment, the first wall 42 of each paddle 40 may be oriented at an angle A1 that is between 45 degrees and 160 degrees with respect to the second wall 44. In another embodiment, angle A1 is between 60 degrees and 150 degrees. In yet another embodiment, angle A1 is between 100 degrees and 140 degrees. For the embodiment shown in FIG. 7, angle A1 is about 120 degrees. For the embodiment shown in FIG. 12, angle A1 is about 70 degrees.

Figure 8:
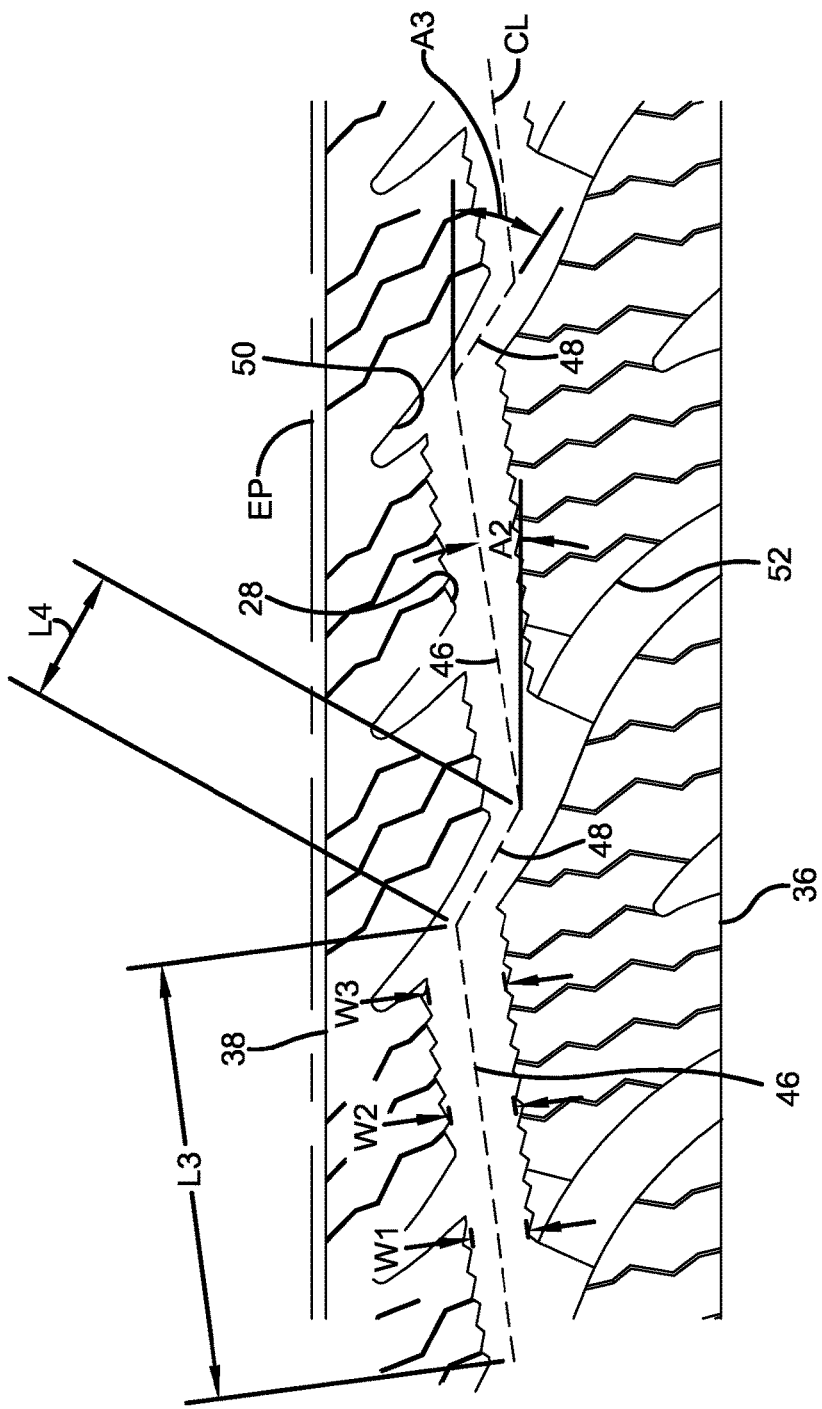
FIG. 8 is a close-up view of a portion of the tread shown in FIG. 3.

With reference now to FIGS. 4 and 8, each of the circumferential grooves that is defined by circumferential ribs having paddles 40, such as first circumferential groove 26 or second circumferential groove 28, seen best in FIG. 8, may have a centerline CL along its length. The circumferential groove 28 may alternate between first portions 46 where the centerline is oriented at an acute angle A2 with respect to the EP and second portions 48 where the centerline is oriented at an acute angle A3 with respect to the EP. To improve the desired performance, in one embodiment acute angle A2 is less than 30 degrees and acute angle A3 is at least 30 degrees. In another embodiment, acute angle A2 is less than 20 degrees and acute angle A3 is at least 40 degrees. In another embodiment, acute angle A2 is less than 15 degrees and acute angle A3 is at least 50 degrees. The first portions 46 may have a length L3 along the centerline CL and the second portions 48 may have a length L4 along the centerline CL. To improve the desired performance, in one embodiment a ratio RG of L3/L4 of neighboring portions 46, 48 may be at least 1.5. In another embodiment, the ratio RG is at least 3.0. To improve the desired performance, in one embodiment the first portions 46 of the circumferential groove 28 tapers or gradually changes in width from one end to the other. FIG. 8, for example, illustrates the first portion 46 of groove 28 tapering or gradually changing in width from width W1, to width W2, to width W3.

Figure 9:
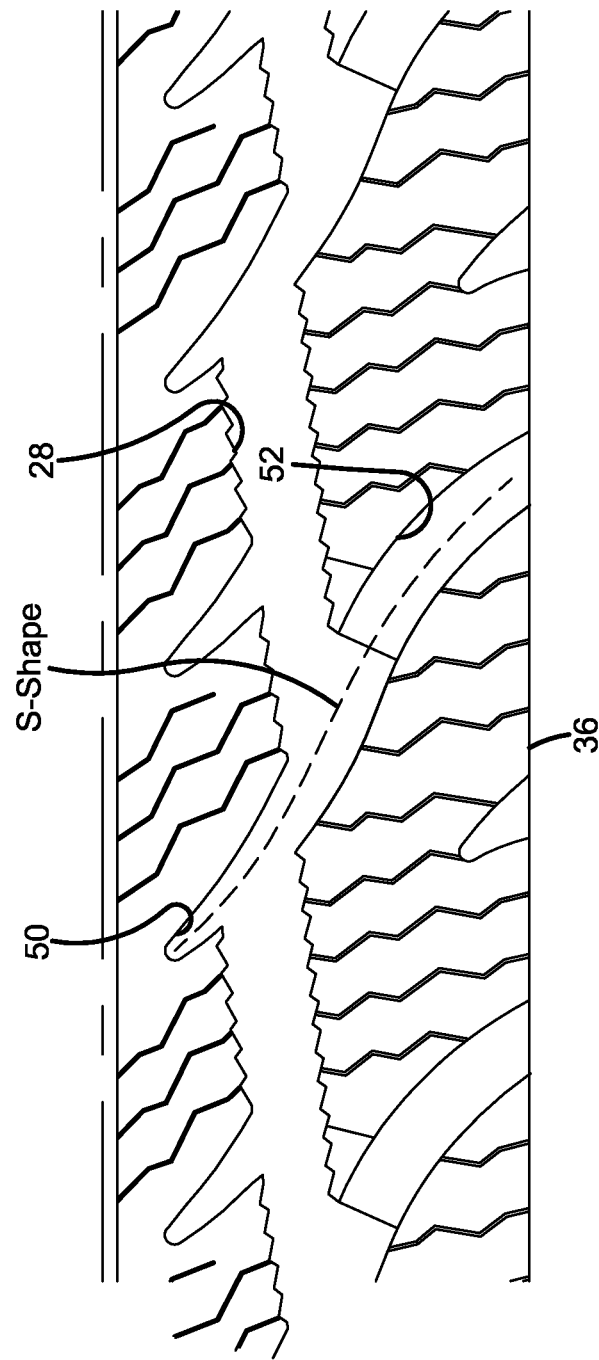
FIG. 9 is a close-up view of a portion of the tread similar to that shown in FIG. 8.

With reference now to FIGS. 4 and 8-9, circumferential rib 20 may have lateral grooves 50 that extend inwardly, circumferential ribs 22, 24 may have lateral grooves 52 and circumferential ribs 30, 32 may have lateral grooves 54. Lateral grooves 50 may extend from the second portions 48 of the circumferential groove 28. Lateral grooves 52 may also extend from the second portions 48 of the circumferential groove 28. In one embodiment, shown, lateral grooves 52 may extend continuously through the circumferential ribs 22, 24 from circumferential grooves 26, 28 to circumferential grooves 34, 36. As shown in FIG. 9, the combination of lateral groove 52, circumferential groove 28 and lateral groove 50 may be substantially S-shaped.

With reference now to FIG. 4, circumferential rib 20 may have sipes 56 that are substantially oriented at an acute angle A4 with respect to the Equatorial Plane (EP). The sipes 56 may have a wavy shape. In one embodiment, sipes 56 extend on both sides of the EP, as shown. Angle A4 may be at least 30 degrees, in one embodiment. Circumferential ribs 22, 24 may have sipes 58 that are parallel to the EP or substantially oriented at an acute angle A5 with respect to the EP. The sipes 58 may have a wavy shape. Angle A5 may be at least 70 degrees, in one embodiment.

Figure 10:
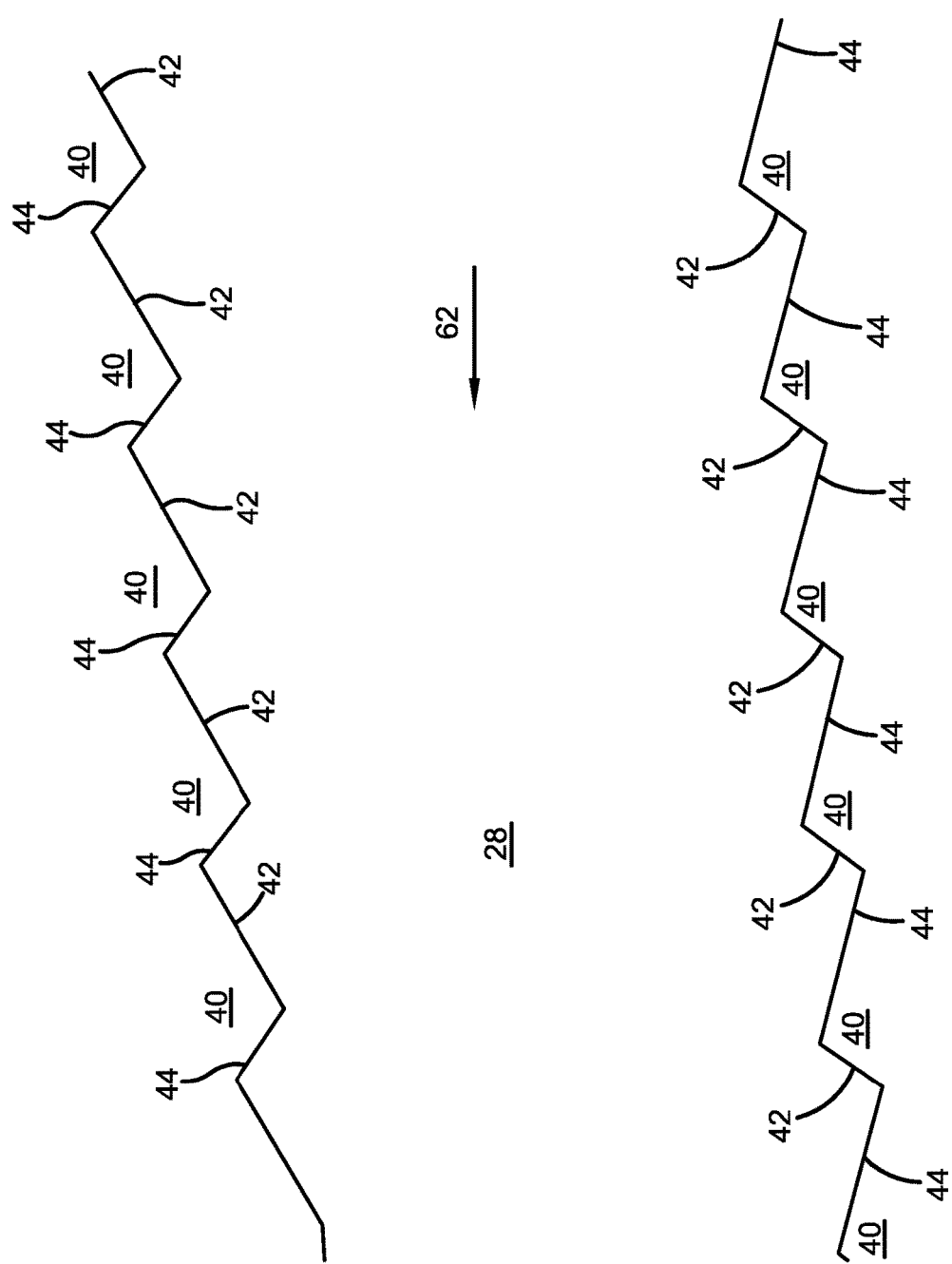
FIG. 10 shows a relative orientation of paddles according to an embodiment of this invention.
Figure 11:
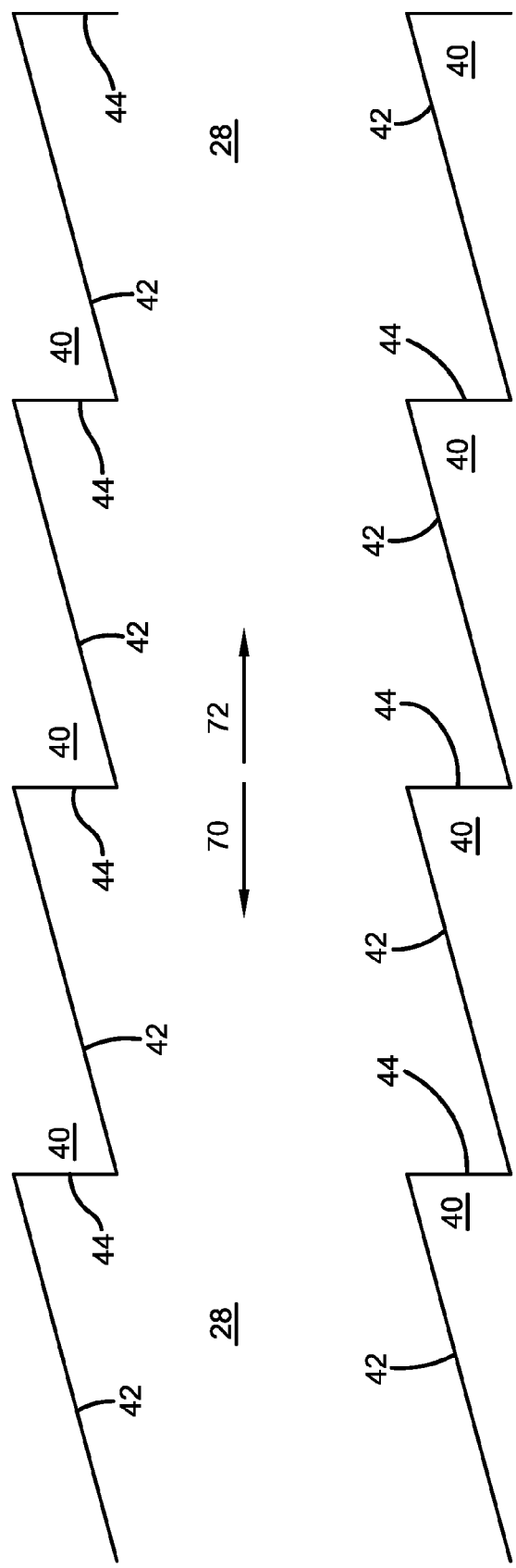
FIG. 11 shows a relative orientation of paddles according to another embodiment of this invention.

The relative orientation of the paddles 40 on one side wall as compared to the paddles 40 on the opposite side wall of the same groove can be varied by the tire designer to adjust the performance of the tire, as desired. FIG. 10, for example, shows groove 28 defined by a first side wall (at the top) with paddles 40 and a second side wall (at the bottom) with paddles 40. For this embodiment, the paddles 40 on both side walls are oriented with the first walls 42 positioned before the second walls 44 in circumferential direction 66. FIG. 11 shows another embodiment where the paddles 40 on the upper side wall are oriented with the first walls 42 positioned before the second walls 44 in first circumferential direction 70 but with the paddles 40 on the lower side wall oriented with the first walls 42 positioned before the second walls 44 in second circumferential direction 72, that is opposite circumferential direction 70.

Figure 12:
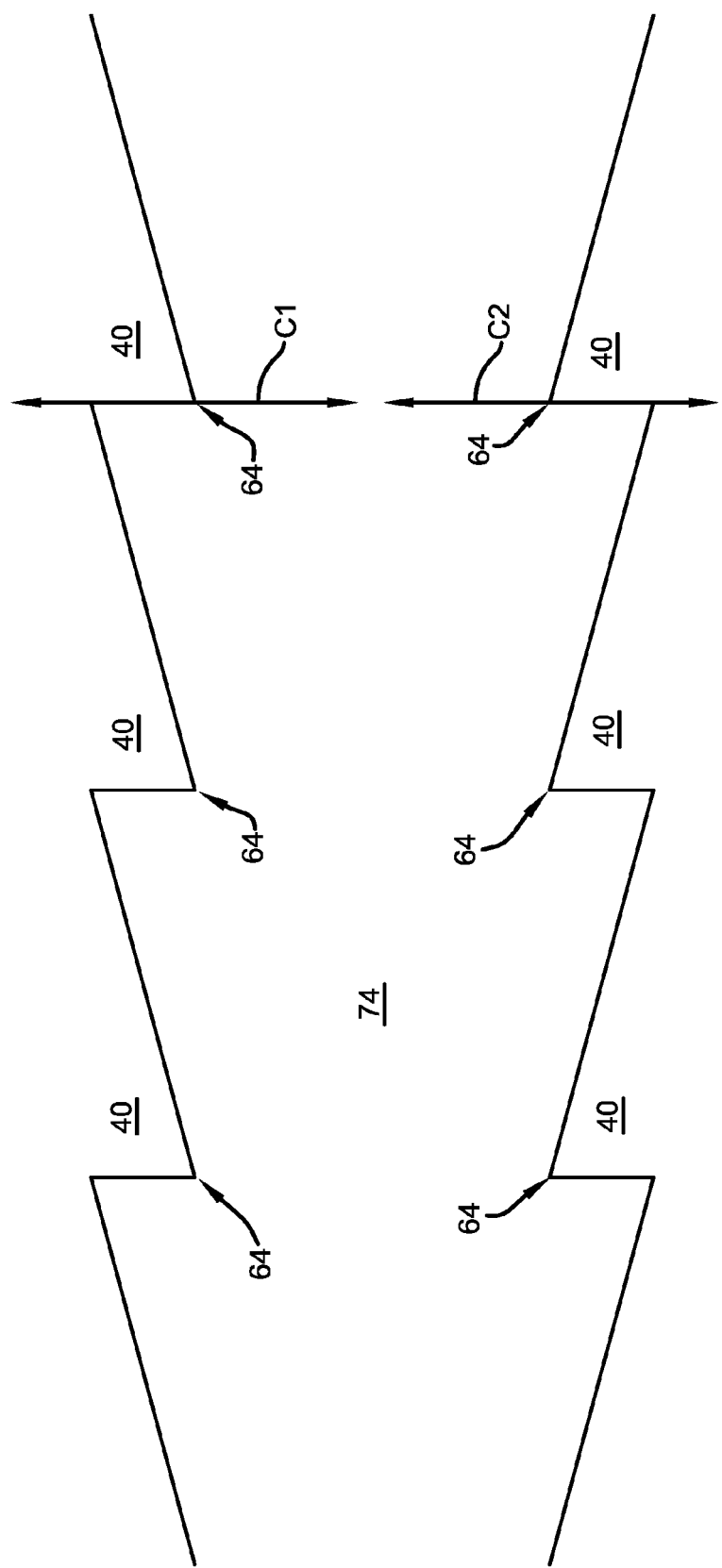
FIG. 12 shows a relative orientation of paddles according to another embodiment of this invention.
Figure 13:
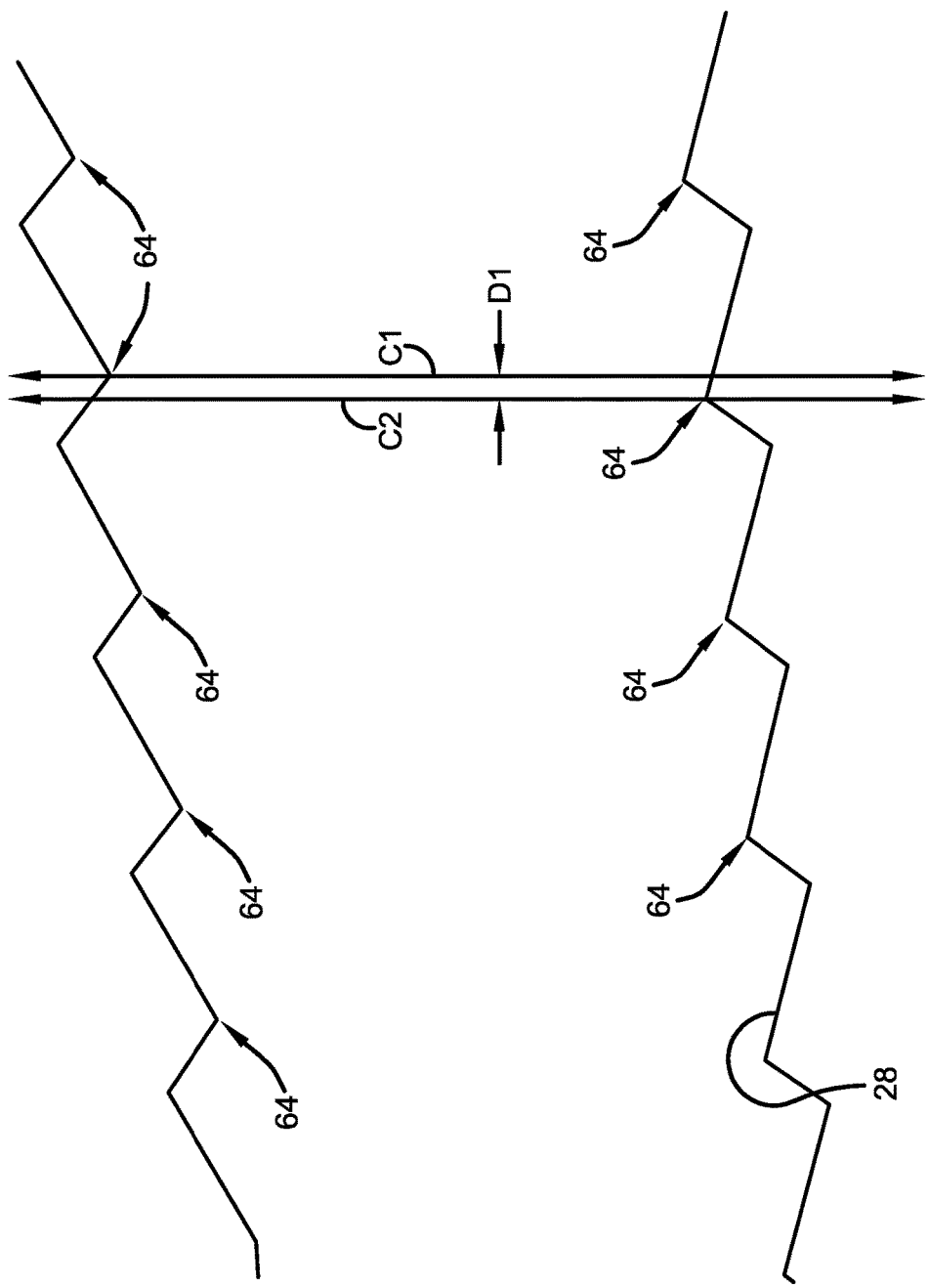
FIG. 13 shows a relative orientation of paddles according to yet another embodiment of this invention.

The relative orientation of the paddles 40 on one side wall as compared to the paddles 40 on the opposite side wall of the same groove can also be varied regarding the circumferential location of the intersection points 64. Intersection points 64 were discussed above. FIG. 12 shows groove 74 defined by a first side wall (at the top) with paddles having intersection points 64 and a second side wall (at the bottom) with paddles also having intersection points 64. For this embodiment, the paddles 40 are oriented so that a first axial line C1 that passes through a first intersection point 64 of the first and second walls of one of the plurality of paddles 40 on the upper side face is substantially collinear with a second axial line C2, nearest the first axial line, that passes through a second intersection point 64 of the first and second walls of one of the plurality of paddles 40 on the lower side face. FIG. 13 shows another embodiment with groove 76 having paddles oriented so that a first axial line C1 that passes through a first intersection point 64 of the first and second walls of one of the plurality of paddles 40 on the upper side face is spaced a distance D1 from a second axial line C2, nearest the first axial line, that passes through a second intersection point 64 of the first and second walls of one of the plurality of paddles 40 on the lower side face. The distance D1 may be determined according to the desired performance. In one embodiment, the distance D1 is greater than zero but is less than or equal to length L1 of the corresponding paddle. In another embodiment, the distance D1 is less than or equal to length L2 of the corresponding paddle.

It should also be noted that in other embodiments the paddles in one groove may be oriented with respect to paddles in another groove. In one specific embodiment, the paddles in two grooves may be oriented with the first walls positioned before the second walls in a first circumferential direction. The paddles in both grooves, for example, may be oriented like groove 28 in FIG. 10, or the paddles in both grooves may be oriented like groove 74 in FIG. 12, or the paddles in one groove may be oriented like groove 28 in FIG. 10 while the paddles in the other groove may be oriented like groove 74 in FIG. 12. In another embodiment, the paddles in one groove may be oriented with the first walls positioned before the second walls in a first circumferential direction while the paddles in another groove may be oriented with the first walls positioned before the second walls in a second circumferential direction that is opposite the first circumferential direction. The paddles in one groove, for example, may be oriented like groove 28 in FIG. 10 while the paddles in another groove are oriented like groove 78 in FIG. 14. In yet another embodiment, the paddles on the first side of a first groove may be oriented the same as the paddles on the first side of a second groove while the paddles on the second side of the first groove may be oriented the same as the paddles on the second side of the second groove. Both grooves, for example, may have paddles oriented as with groove 68 in FIG. 11. Different grooves may also be varied regarding the circumferential location of the intersection points. Both grooves, for example, may be similar, such as both being as shown in FIG. 12 or both as shown in FIG. 13. In another embodiment, one groove may have paddles with intersection points that are axially collinear, such as shown in FIG. 12, while another groove may have paddles with intersection points that are off-set a distance D1, such as shown in FIG. 13.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved

I claim:

1. A vehicle tire having a tread comprising:
a first circumferential rib having a side face that defines a first side of a circumferential groove;
a second circumferential rib having a side face that defines a second side of the circumferential groove;
wherein the first circumferential rib side face comprises a plurality of radially extending paddles each defined by first and second walls that extend from the first circumferential rib side face;
wherein the second circumferential rib side face comprises a plurality of radially extending paddles each defined by first and second walls that extend from the second circumferential rib side face;
wherein a ratio RW of a length of each first wall to a length of each second wall for each of the paddles is 1.6;
wherein:
the plurality of paddles on the first circumferential rib side face are oriented with the first walls positioned before the second walls in a first circumferential direction; and,
the plurality of paddles on the second circumferential rib side face are oriented with the first walls positioned before the second walls in a second circumferential direction that is opposite the first circumferential direction.

2. A vehicle tire having a tread comprising:
a first circumferential rib having a side face that defines a first side of a circumferential groove;
a second circumferential rib having a side face that defines a second side of the circumferential groove;
wherein the first circumferential rib side face comprises a plurality of radially extending paddles each defined by first and second walls that extend from the first circumferential rib side face;
wherein the second circumferential rib side face comprises a plurality of radially extending paddles each defined by first and second walls that extend from the second circumferential rib side face;
wherein a ratio RW of a length of each first wall to a length of each second wall for each of the of paddles is 1.6;
wherein:
the plurality of paddles are oriented so that a first axial line C1 that passes through a first intersection point that connects a pair of lines collinear with the first and second walls of one of the plurality of paddles on the side face of the first circumferential rib is spaced a distance D1 from a second axial line C2, nearest the first axial line, that passes through a second intersection point that connects a pair of lines collinear with the first and second walls of one of the plurality of paddles on the side face of the second circumferential rib; and,
the distance D1 is greater than zero and less than or equal to a length L1 of the first wall of the one of the plurality of paddles on the side face of the first circumferential rib.

3. A vehicle tire having a tread comprising: a first circumferential rib having a side face that defines a first side of a circumferential groove; a second circumferential rib having a side face that defines a second side of the circumferential groove; wherein the first circumferential rib side face comprises a plurality of radially extending paddles each defined by first and second walls that extend from the first circumferential rib side face; wherein the second circumferential rib side face comprises a plurality of radially extending paddles each defined by first and second walls that extend from the second circumferential rib side face; wherein a ratio RW of a length of each first wall to a length of each second wall for each of the of paddles is 1.6; wherein at least a portion of the circumferential groove gradually changes in width along its length.

\* \* \* \* \*